United States Patent [19]
Epel et al.

[11] 3,742,086
[45] June 26, 1973

[54] THERMOSETTING COMPOSITION

[76] Inventors: Joseph N. Epel, 22559 Bellbrook, Southfield, Mich. 48075; Michael Hugh Richmond, 1314 Chudleigh Drive, Sarnia, Ontario, Canada

[22] Filed: May 28, 1971

[21] Appl. No.: 148,212

[52] U.S. Cl......... 260/836, 260/37 EP, 260/41.5 R
[51] Int. Cl. ............................................ C08f 33/00
[58] Field of Search........................... 260/41.5, 836

[56] References Cited
UNITED STATES PATENTS

| | | | |
|---|---|---|---|
| 3,217,066 | 11/1965 | Greenspan et al.............. | 260/836 X |
| 3,506,736 | 4/1970 | Najvar ............................ | 260/836 X |
| 3,367,992 | 2/1968 | Bearden.......................... | 260/836 X |

*Primary Examiner*—Lewis T. Jacobs
*Attorney*—Stevens, Davis, Miller & Mosher

[57] ABSTRACT

An improved thermosetting resin composition and the process of producing a thermoset resin comprising the reaction of an epoxidized polymer, especially epoxidized polybutadiene, with an alpha-beta unsaturated monocarboxylic compound and a compatible copolymerizable monomer.

4 Claims, No Drawings

THERMOSETTING COMPOSITION

This invention relates to a thermosetting resin composition and to the process of producing a thermoset resin wherein an epoxidized polymer is reacted with an organic acid and a copolymerizable monomer.

Epoxidized polybutadiene is well known as also are certain of its reactions with, for example, organic acids. By mixing a multi-functional organic acid, i.e., a dicarboxylic acid, with an epoxidized polybutadiene, the epoxidized polybutadiene may be crosslinked. If an unsaturated dicarboxylic acid is mixed in the presence of a compatible copolymerizable olefinically unsaturated monomer with epoxidized polybutadiene the whole may be cured through the unsaturated groups to form a thermoset resin. Good dispersion of these components among themselves is difficult to achieve due to the reaction of the dicarboxylic acid and the epoxidized polybutadiene to form a product which is at least partially insoluble in the copolymerizable monomer.

It is an objective of this invention to produce a thermoset resin by the interpolymerization of an epoxidized polymer, an alpha-beta unsaturated monocarboxylic acid and a copolymerizable olefinically substituted monomer. The improvements over the prior art which may be achieved thereby include the attainment of a useful range of properties in the thermoset resin, easy dispersion and intermixing of the materials used to make the thermoset resin and good control of the inter-polymerization of the curing step.

This invention provides a thermosetting resin composition comprising (a) an epoxidized polymer of a conjugated diolefin containing four to five carbon atoms, said polymer containing about 20 moles to about 60 moles of the epoxide groups per 100 moles of the diolefinic units in the polymer, (b) an alpha-beta ethylenically unsaturated mono-carboxylic acid in an amount of 0.9 to about 2 times the equimolar amount for reaction with the epoxide groups in (a), and (c) a copolymerizable monomer selected from olefinically substituted aromatic compounds and from nitriles and hydrocarbyl esters of acrylic acid and alkacrylic acids and mixtures thereof. The invention is also directed to the process of preparing a thermoset resin which comprises (I) mixing (a) an epoxidized polymer of a conjugated diolefin containing four to five carbon atoms, said polymer containing about 20 moles to about 60 moles of the epoxide groups per 100 moles of the diolefinic units in the polymer, (b) an alpha-beta ethylenically unsaturated monocarboxylic acid in an amount of 0.9 to about 2 times the equimolar amount for reaction with the epoxide groups contained in (a), and (c) a copolymerizable monomer selected from olefinically substituted aromatic compounds and from nitriles and hydrocarbyl esters of acrylic acid and alkacrylic acids, and mixtures thereof, (II) raising the temperature of the mixture to a temperature above about 100°C and (III) inter-polymerizing the mixture to the substantial disapperance of the monomer.

A polymer comprising a $C_4$ or $C_5$ conjugated diolefin is used as the starting material for the production of the epoxidized polymer, which polymer may be prepared by any of the well-known methods of the prior art. Such methods include emulsion free-radical polymerization and polymerization in solution using ionic catalysts and organo-metallic catalysts. The conjugated diolefins which may be so polymerized are those containing four to five carbon atoms, i.e., butadiene-1,3, 2-methyl butadiene-1,3 (isoprene) and 1-methyl butadiene-1,3 (pentadiene-1,3). Copolymers of $C_4$ or $C_5$ conjugated diolefins with vinyl compounds may also be used. Copolymerizable vinyl compounds include, but are not limited to, acrylonitrile, ethyl acrylate and styrene. The structural configuration of those monomer units of the polymer which were derived from conjugated diolefin is not of profound significance to the properties of the epoxidized polymer formed therefrom: polymer structures may include 1,2 polymer, cis and trans 1,4 polymer and 3,4 polymer. Suitable copolymers contain at least 50 weight per cent of the conjugated diolefin. Suitable butadiene-styrene polymers range in composition from 50 percent butadiene plus 50 percent styrene to about 99 percent butadiene plus about 1 percent styrene. A preferred polymer is polybutadiene. The molecular weight of the conjugated diolefin polymer is in the range of about 500 to about 100,000, preferably 1,000 to about 50,000 and most preferably about 2,000 to about 20,000. The molecular weight of the polymer is largely dictated by the use to be made of the thermoset resin finally derived therefrom, the polymer molecular weight being limited simply to that which can be conveniently handled in the particular process or application.

The epoxidation of the so-formed diolefin polymer may be readily achieved by any of the well-known methods including treatment of the polymer, generally in solution, with hydrogen peroxide admixed with a lower alkanoic acid or with the per-acids derived from the lower alkanoic acids. It is desirable that the epoxide oxygen content of the polymer be in the range of about 20 to about 60 moles per 100 moles of diolefin found in the polymer. For a polybutadiene, this epoxide oxygen range corresponds to about 4.5 to about 13.7 weight percent of oxirane oxygen in the polymer. A preferred range for the epoxide oxygen content of a polybutadiene is from 22 to 37 moles of epoxide oxygen per 100 moles of butadiene in the polymer, which range corresponds to the range 5 to 8.5 weight percent of oxirane oxygen. The level of the oxirane oxygen content of the epoxidized polymer affects the amount of alpha-beta unsaturated mono-carboxylic acid which can react with the polymer and also, to some extent, by the mass action law, influences the rate at which the said mono-carboxylic acid can react with the epoxidized polymer.

To form the thermosetting resin composition, the epoxidized polymer is mixed with an alpha-beta ethylenically unsaturated mono-carboxylic acid and with a copolymerizable olefinically substituted monomer. The alpha-beta unsaturated mon-carboxylic acid may be selected from said acids, per se, and from alpha-beta unsaturated di- or poly- carboxylic acids wherein all the acid groups except one have been esterified, provided only that the so-formed mono-carboxylic acid is still sufficiently reactive to react with the epoxide groups of the polymer at a reasonable rate. Examples of suitable unsaturated mono-carboxylic acids include the aliphatic compounds such as acrylic acid, methacrylic acid, chlor-acrylic acid, crotonic acid, the monomethyl and the mono-ethyl esters of maleic acid or of fumaric acid and aromatic compounds such as cinnamic acid. The quantity of said acid mixed with the polymer should be about equimolar with the epoxide content of the polymer. One mole of mono-functional acid is theoretically chemically equivalent to one mole of epoxide assuming the reaction to go to completion. By using 0.9 to 2 times the equimolar amount of said acid for reaction with the epoxide groups of the polymer, it is possible to ensure an essential completion of the reaction of the acid with the epoxide groups of the polymer. A maximum amount of about two moles of acid per mole of epoxide is a practical limitation. A preferred amount of monocarboxylic acid is the equimolar amount per mole of epoxide in the epoxidized polymer thus leading, on completion of the reaction, to an essentially acid-free reaction product. However, it is to be understood that the use of as low as 0.5 moles of acid per mole of epoxide is within the scope of this invention, particularly for polymers containing high levels of epoxide such as 10, or greater, weight percent oxirane oxygen.

The epoxidized polymer is also mixed with a copolymerizable olefinically substituted monomer. The copolymerization of the olefinically substituted monomer is achieved by the action of heat alone or by the action of heat in the presence of a source of free radicals. Thus the copolymerizable monomer should be susceptible to a free radical initiated reaction. Suitable monomers are selected on the basis of compatibility with the epoxidized polymer and suitable properties for the application from the classes comprising olefinically substituted aromatic compounds and from the nitrile and hydrocarbyl esters of acrylic and alkacrylic acids and mixtures thereof. Suitable olefinically substituted aromatic compounds include the vinyl substituted aromatic compounds such as styrene, chlorostyrene, alpha-methyl-styrene, vinyl toluene, divinyl benzene, tertiary butyl styrene and mixtures thereof. Other suitable copolymerizable unsaturated compounds include diallyl phthalate and triallyl cyanurate. Nitrile and hydrocarbyl esters of acrylic and alkacrylic acids include acrylonitrile, methacrylonitrile, methylacrylate and methyl methacrylate. Mixtures may also be used of olefinically substituted aromatic compounds and nitrile or hydrocarbyl esters of acrylic and alkacrylic acids which contain at least 50 percent of the aromatic compound, especially styrene. A preferred amount of said copolymerizable monomer mixed with the epoxidized polymer and unsaturated mono-carboxylic acid is such that it forms from about 5 to about 50 weight percent of the total of the epoxidized polymer puls unsaturated monocarboxylic acid plus copolymerizable monomer, the quantity used largely being determined by the properties required of the final thermoset. A most preferred level for the amount of copolymerizable monomer is 30 weight percent of the total of the epoxidized polymer plus unsaturated monocarboxylic acid plus copolymerizable monomer.

The mixture of epoxidized polymer, alpha-beta unsaturated mono-carboxylic acid and the copolymerizable monomer which comprises the thermosetting resin composition may also contain a filler. Such fillers will need to be moderately chemically inert to the monocarboxylic acid and the selection is thus limited to such materials as glass fibres, asbestos fibres, particulate silica, silicate such as Wollastonite and carbon fibres. The amount of filler to be used may be such that it forms up to about 400 parts by weight per 100 parts by weight of the sum of the epoxidized polymer plus monocarboxylic acid plus copolymerizable monomer.

The thermosetting resin composition may also contain a small quantity of a free radical polymerization catalyst. Such a catalyst is selected in order that it has a rapid rate of formation of free radicals at the temperature at which the composition is to be cured. By suitable selection of the catalyst it is possible to affect the pot life and mixing time of the thermosetting resin composition. Also, such selection affects the cure time necessary to produce the thermoset resin. Catalysts are selected from the organic per-compounds such as the organic peroxides, hydroperoxides and per-esters as exemplified by dicumyl peroxide, cumene hydroperoxide and tertiary butyl perbenzoate. The quantity of the catalyst added is usually not more than about 5 weight percent based on the weight of the epoxidized polymer plus monocarboxylic acid plus copolymerizable monomer and preferably is from 1 to 3 weight percent. Accelerators or promoters, particularly for the organic peroxide catalysts, may also be present, such accelerators including cobalt salts and tertiary amines.

The thermosetting resin composition may also contain additives which act as lubricants and mold release agents, such additives including fatty acid esters and metal carboxylates. Other additives such as for flame retardancy, which include antimony compounds and halogen-containing compounds, may also be present.

The thermosetting resin composition may be shaped by any of the known methods of molding, laminating and casting and, once shaped, is cured, optionally as an integral step in the shaping operation, by raising the temperature. The temperature is raised to at least 100°C, the factor controlling the actual curing temperature used largely being the time available for said curing. For example, if the composition is shaped by molding and is also to be cured in the mold, then it is advantageous to keep to a minimum the length of time that the material is in the mold. Under such conditions, a high curing temperature would be used for a short time, such a temperature in the range of 140° to 210°C, preferably in the range of about 150°C to about 175°C, with a curing time of one to 10 minutes. High productivity may then be achieved from a minimum of equipment.

The procedure for mixing the thermosetting resin composition is exemplified by the formation of a premix but the components may be combined in any suitable manner. Said premix is composed of the epoxidized polymer, styrene, zinc stearate and tertiary butyl perbenzoate mixed in a high-speed rotary stirrer. This premix is then placed in a sigma-bladed mixer, the filler added over not more than about 15 minutes of mixing time, followed by the addition of the acrylic acid and the whole is mixed for about 5 minutes in order to insure good dispersion of all ingredients, yielding a viscous paste. The mixing is carried out preferably at about room temperature or at a temperature low enough not to initiate a curing reaction. A curing mold which has been covered with aluminum foil is preheated to the curing temperature. The mixture is rapidly transferred into the heated mold, the mold closed and maintained at the constant temperature for the required curing time. The mold is maintained closed by the application of an external pressure which, for the procedure used in the examples of this invention, was 2,100 psi. However, it would be within the skill of the known art to vary the pressure applied to the mold from about atmospheric pressure up to about 15,000 psi depending on the particular molding operation.

The cooled, cured sheet is cut into bars of dimensions 6 inches by one-half inch by one-fourth inch for measurement of the flexural properties as per ASTM D-790-66 and for measurement of the heat distortion properties. The tensile strength, per cent elongation and impact strength of the thermoset are determined using bars of dimension 6 inches by one-half inch by three-sixteenths inch. Hardness measurements are Barcol, ASTM D-2583-67. The oxirane oxygen content of the original epoxidized polymer is determined by ASTM D-1652-67.

The following examples illustrate the working of the invention but are not to be construed as limiting the invention. Unless otherwise stated, all parts are parts by weight.

EXAMPLE 1

Thermosetting resin compositions were prepared using epoxidized polymers of two different oxirane oxygen contents, the epoxidized polymers being derived from the butadiene polymers shown in the Table, and were mixed in the compounding recipes given in Table I. The compounded thermosetting resins were transferred to preheated molds and cured at the temperatures and for the times shown in Table I. The properties of the thermoset resins so formed are shown in the Table.

EXAMPLE 2

A butadiene polymer of a high 1:2 microstructure was epoxidized to two levels of oxirane oxygen to produce the epoxidized polymers identified in Table I. The epoxidized polymers were compounded in the recipes given in Table I to yield thermosetting resin compositions which were transferred to pre-heated molds and cured at the temperatures and for the times shown in the Table. The properties of the thermoset resins so produced are given in Table I.

+ acid) and were then transferred to pre-heated molds. Following cure at 350°F the resulting thermoset resins were evaluated with the results given in Table II.

TABLE II

| Example No. 3 Experiment No. | a | b | | c |
|---|---|---|---|---|
| Butadiene Polymer Microstructure | 37% cis 1,4; 51% trans 1,4; | | | 12% 1:2 |
| Molecular Weight | 12500 | 3300 | | 3300 |
| Epoxidized Polymer Oxirane oxygen (wt.%) | 8.0 | 7.4 | | 7.4 |
| Compound Recipe (by wt.) | | | | |
| Epoxidized polymer | 13.0 | 15.8 | | 9.3 |
| Acrylic acid | 4.5 | 5.45 | | 3.2 |
| Molar ratio epoxide groups:acid | 1:1 | 1:1 | | 1:1 |
| Styrene | 7.5 | 3.75 | | 12.5 |
| Wt. ratio styrene: (polymer + acid) | 3:7 | 3:17 | | 1:1 |
| Wollastonite | 73.9 | 73.9 | | 73.9 |
| t-butyl perbenzoate | 0.5 | 0.5 | | 0.5 |
| Zinc stearate | 0.6 | 0.6 | | 0.6 |
| Cure Conditions | | | | |
| Temperature (°F) | 350 | 350 | 300 | 350 |
| Time (minutes) | 4 | 4 | 5 | 4 |
| Thermoset Resin Properties | | | | |
| Flexural strength (psi) | 9500 | 8000 | 8360 | 8300 |
| Flexural modulus ×10⁶ (psi) | 0.67 | 0.73 | 0.75 | 0.52 |
| Tensile strength (psi) | 5370 | 5330 | 4480 | 4000 |
| Elongation (%) | 0.8 | 1.4 | 1.0 | 0.8 |
| Hardness (Barcol) | 67 | 63 | 58 | 58 |
| Impact strength (ft.lbs/in.) | 2.7 | 3.7 | 2.7 | 2.8 |

EXAMPLE 4

The epoxidized polymer of Example 3, experiments b and c, was compounded with methyl methacrylate or with triallyl cyanurate, instead of styrene, as shown in Table III, and thermoset resins were produced therefrom. The properties of the thermosets are recorded in Table III.

TABLE I

| Example No. | 1 | | 2 | |
|---|---|---|---|---|
| Experiment No. | 1 | 2 | 1 | 2 |
| Butadiene polymer: | | | | |
| Microstructure | 35% cis 1,4; 51% trans 1,4; 14% 1:2 | | 11% cis 1,4; 13% trans 1,4; 76% 1:2 | |
| Molecular weight | 5,000 | | 2,500 | 1,500 | 1,600 |
| Epoxidized polymer: oxirane oxygen (wt. percent) | 6.5 | 7.75 | 5.0 | 8.0 |
| Compound recipe (by wt.): | | | | |
| Epoxidized polymer | 13.5 | 13.0 | 14.3 | 13.0 |
| Acrylic acid | 4.0 | 4.5 | 3.2 | 4.5 |
| Molar ratio epoxide groups:acid | 1:1 | 1:1 | 1:1 | 1:1 |
| Styrene | 7.5 | 7.5 | 7.5 | 7.5 |
| Wt. ratio styrene:(polymer plus acid) | 3:7 | 3:7 | 3:7 | 3:7 |
| Wollastonite | 73.9 | 73.9 | 73.9 | 73.9 |
| t-Butyl perbenzoate | 0.5 | 0.5 | 0.5 | 0.5 |
| Zinc stearate | 0.6 | 0.6 | 0.6 | 0.6 |
| Cure conditions: | | | | |
| Temperature (° F.) | 350 | 300 | 350 | 300 | 350 | 300 | 350 |
| Time (minutes) | 5 | 5 | 4 | 7 | 5 | 5 | 4 |
| Thermoset resin properties: | | | | |
| Flexural strength (p.s.i.) | 6,020 | 7,350 | 8,300 | 7,040 | 6,160 | 16,800 | 15,400 |
| Flexural modulus ×10⁵ (p.s.i.) | 0.41 | 0.65 | 0.78 | 0.66 | 0.59 | 1.73 | 1.75 |
| Tensile strength (p.s.i.) | 3,120 | 3,880 | 5,730 | 4,750 | 5,040 | 8,800 | 6,190 |
| Elongation (percent) | 1.6 | 0.9 | 1.9 | 1.7 | 2.4 | 0.6 | 0.7 |
| Hardness (Barcol) | 35 | 45 | 62 | 50 | 53 | 74 | 73 |
| Impact strength (ft-lbs./in.) | 4.5 | 2.7 | 5.0 | 2.3 | 1.9 | 2.2 | 2.0 |
| Heat distortion: Temperature (° C.) | 107 | 131 | 135 | 75 | 62.5 | | |

EXAMPLE 3

The epoxidized products of low molecular weight polybutadienes were compounded in the recipes given in Table II using a range of ratios of styrene:(polymer

EXAMPLE 5

The epoxidized polymer of Example 4 was compounded using a 2:1 molar ratio of epoxide groups ( of the epoxidized polymer) to acid, as shown in Table III.

The thermoset resin produced had the properties recorded in Table III.

EXAMPLE 6

An epoxidized liquid polybutadiene, containing 7.4 wt. % oxirane oxygen, was compounded into an unfilled thermosetting mixture using the following recipe:

| | |
|---|---|
| epoxidized polymer | 51 parts by weight |
| acrylic acid | 17.6 " |
| styrene | 29.4 " |
| t-butyl perbenzoate | 1.4 " |
| zinc stearate | 0.6 " |

The ratio of acrylic acid to epoxide groups is 1:1 and the ratio of styrene to polymer plus acid is 3:7. On curing for four minutes at 350°F, a thermoset resin was produced which had a Barcol hardness of 10, a flexural strength of 4,160 psi and a flexural modulus of 0.11 ×10⁶ psi.

The above examples illustrate that resins with a useful range of properties may be prepared by the process of this invention. During the process of preparing the thermosetting compositions of this invention it was noted that the admixing of the monocarboxylic acid with the epoxidized polymer did not cause the formation of an incompatible phase, as would have occurred in the prior art, and good dispersion of the components of the thermosetting composition was readily achieved.

TABLE III

| Example No. | | 4 | | 5 |
|---|---|---|---|---|
| Experiment No. | | a | b | |
| Butadiene Polymer | | | | |
| Microstructure | 37% cis 1,4; 51% trans 1,4; | | | 12% 1,2 |
| Molecular Weight | 3300 | | | |
| Epoxidized Polymer | | | | |
| Oxirane oxygen (wt.%) | | 7.4 | 7.4 | 7.4 |
| Compound Recipe (by wt.) | | | | |
| Epoxidized polymer | | 13.0 | 13.0 | 10.3 |
| Acrylic acid | | 4.5 | 4.5 | 7.2 |
| Molar ratio epoxide groups:acid | | 1:1 | 1:1 | 2:1 |
| Polymerizable monomer type | | Methyl methacrylate | triallyl cyanurate | styrene |
| amount | | 7.5 | 7.5 | 7.5 |
| Wt. ratio polymerizable monomer: (polymer + acid) | | 3:7 | 3:7 | 3:7 |
| Wollastonite | | 73.9 | 73.9 | 73.9 |
| t-butyl perbenzoate | | 0.5 | 0.5 | 0.5 |
| Zinc stearate | | 0.6 | 0.6 | 0.6 |
| Cure Conditions | | | | |
| Temperature (°F) | | 350 | 300 | 300 |
| Time (minutes) | | 4 | 5 | 5 |
| Thermoset Resin Properties | | | | |
| Flexural strength (psi) | | 10200 | 6380 | 9960 |
| Flexural modulus ×10⁶ (psi) | | 0.8 | 0.6 | 1.11 |
| Tensile strength (psi) | | 6000 | 3860 | 5030 |
| Elongation (%) | | 1.8 | 1.5 | 0.6 |
| Hardness (Barcol) | | 68 | 56 | 60 |
| Impact strength ft.lbs/in. | | 3.6 | 2.6 | 2.0 |
| Heat Distortion Temperature (°C) | | — | 189 | 143 |

What is claimed is:

1. A thermosetting resin composition comprising (a) an epoxidized polymer of a conjugated diolefin containing 4 to 5 carbon atoms, said polymer containing about 20 moles to about 60 moles of diolefinic units in the polymer, (b) an α-β ethylenically unsaturated monocarboxylic acid selected from acrylic acid and the monomethyl ester of maleic acid in an amount of 0.9 to about 2 times the equimolar amount for reaction with the epoxide groups in (a), and (c) a co-polymerizable monomer selected from olefinically substituted aromatic compounds and from nitriles and hydrocarbyl esters of acrylic and alkacrylic acids and mixtures thereof, said monomer (c) being present in an amount from about 5 to about 50 weight per cent of the total of (a) plus (b) plus (c).

2. The composition of claim 1 wherein the conjugated diolefin polymer is a butadiene polymer containing at least 50 percent of butadiene monomer units.

3. The composition of claim 2 wherein the butadiene polymer is polybutadiene having a molecular weight of about 1,000 to about 50,000.

4. The composition of claim 3 wherein the polymerizable monomer is selected from the group consisting of styrene, methyl methacrylate and mixtures thereof containing at least 50 weight percent styrene.

* * * * *